(12) United States Patent
Lee et al.

(10) Patent No.: US 9,510,291 B2
(45) Date of Patent: Nov. 29, 2016

(54) M2M DEVICES AND COMMUNICATION METHODS THEREOF

(71) Applicant: Intel Corporation, Santa Clara, CA (US)

(72) Inventors: Anthony Lee, San Diego, CA (US); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/472,580

(22) Filed: Aug. 29, 2014

(65) Prior Publication Data

US 2015/0065129 A1    Mar. 5, 2015

(30) Foreign Application Priority Data

Aug. 30, 2013  (CN) .......................... 2013 1 0389312

(51) Int. Cl.
*H04W 52/02* (2009.01)
*H04W 4/00* (2009.01)
*H04W 76/06* (2009.01)

(52) U.S. Cl.
CPC ........... *H04W 52/028* (2013.01); *H04W 4/005* (2013.01); *H04W 52/0235* (2013.01); *H04W 76/06* (2013.01)

(58) Field of Classification Search
CPC ..... H04W 60/00; H04W 60/04; H04W 8/26; H04W 12/06; H04W 8/04; H04W 52/028; H04W 4/005; H04W 52/0235; H04W 52/08; H04W 76/06
See application file for complete search history.

(56) References Cited

U.S. PATENT DOCUMENTS

| 2013/0250827 A1* | 9/2013 | Patwardhan ............ H04W 8/24 370/311 |
| 2013/0324122 A1* | 12/2013 | Lee et al. .................... 455/435.1 |
| 2014/0128062 A1* | 5/2014 | Batchu et al. ............. 455/435.1 |
| 2014/0169340 A1* | 6/2014 | Gupta ............... H04W 72/0446 370/336 |

FOREIGN PATENT DOCUMENTS

| CN | 102238476 A | 11/2011 |
| CN | 103024909 A | 4/2013 |

OTHER PUBLICATIONS

Office Action received for Chinese Patent Application No. 201310389312.1, mailed on Sep. 15, 2015, 7 page of Chinese Office Action.
Office Action received for Chinese Patent Application No. 201310389312.1, mailed on Jan. 21, 2016, 4 pages of Chinese Office Action only.
Office Action received for Chinese Patent Application No. 201310389312.1 mailed on Jun. 21, 2016, 3 pages of Chinese Office Action.

* cited by examiner

*Primary Examiner* — Ted Wang
(74) *Attorney, Agent, or Firm* — Forefront IP Lawgroup of Christie and Rivera, PLLC (57) ABSTRACT

M2M devices and communication methods thereof are provided. The communication method is adopted by a M2M device, including: establishing a traffic channel with a base station; transmitting M2M data via the traffic channel; determining that the M2M device is going to be powered down; and transmitting power-down registration information via the traffic channel.

2 Claims, 6 Drawing Sheets

M2M DEVICES AND COMMUNICATION METHODS THEREOF

CROSS REFERENCE TO RELATED APPLICATIONS

This Application claims priority of Chinese Patent Application No. 201310389312.1 filed on Aug. 30, 2013, and the entirety of which is incorporated by reference herein.

BACKGROUND OF THE INVENTION

Field of the Invention

The present invention relates to communication system, and in particular to a Machine-to-Machine (M2M) communication system in an M2M communication and a method thereof.

Description of the Related Art

Machine-to-Machine (M2M) communications, such as a Machine Type Communication (MTC), is a type of communications device which requires no human interaction or intervention, and employs wired or wireless communication networks to detect or measure M2M events such as meter readings, alerts for abnormal conditions, and so on.

The M2M communication can include establishing a connection between a network server and an M2M device, where the M2M device can be identified by an M2M subscriber identifier. A network service provider supplies the M2M subscriber identifier of the M2M device to an M2M user. The network server communicates with the M2M device, and detects the M2M events based on the M2M subscriber identifier. Upon detection of the M2M event, a corresponding reaction may be taken to the M2M device.

BRIEF SUMMARY OF THE INVENTION

A detailed description is given in the following embodiments with reference to the accompanying drawings.

An embodiment of a communication method is provided, adopted by a Machine-to-Machine (M2M) device, comprising: establishing a traffic channel with a base station; transmitting M2M data through the traffic channel; determining that the M2M device is going to be powered down; and transmitting power-down registration information through the traffic channel.

Another embodiment of a communication method is disclosed, adopted by an M2M device, comprising: establishing an access channel with a base station; determining that the M2M device is going to be powered down; and transmitting M2M data which carries power-down registration information through the access channel.

Still another embodiment of an M2M device is revealed, comprising a transceiver and a controller. The transceiver is configured to establish a traffic channel with a base station, and transmit M2M data through the traffic channel. The controller is configured to determine that the M2M device is going to be powered down. The transceiver is configured to transmit power-down registration information through the traffic channel.

Yet another embodiment of an M2M device is revealed, comprising a transceiver and a controller. The transceiver is configured to establish a traffic channel with a base station. The controller is configured to determine that the M2M device is going to be powered down. The transceiver is configured to transmit M2M data which carries power-down registration information through the access channel.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
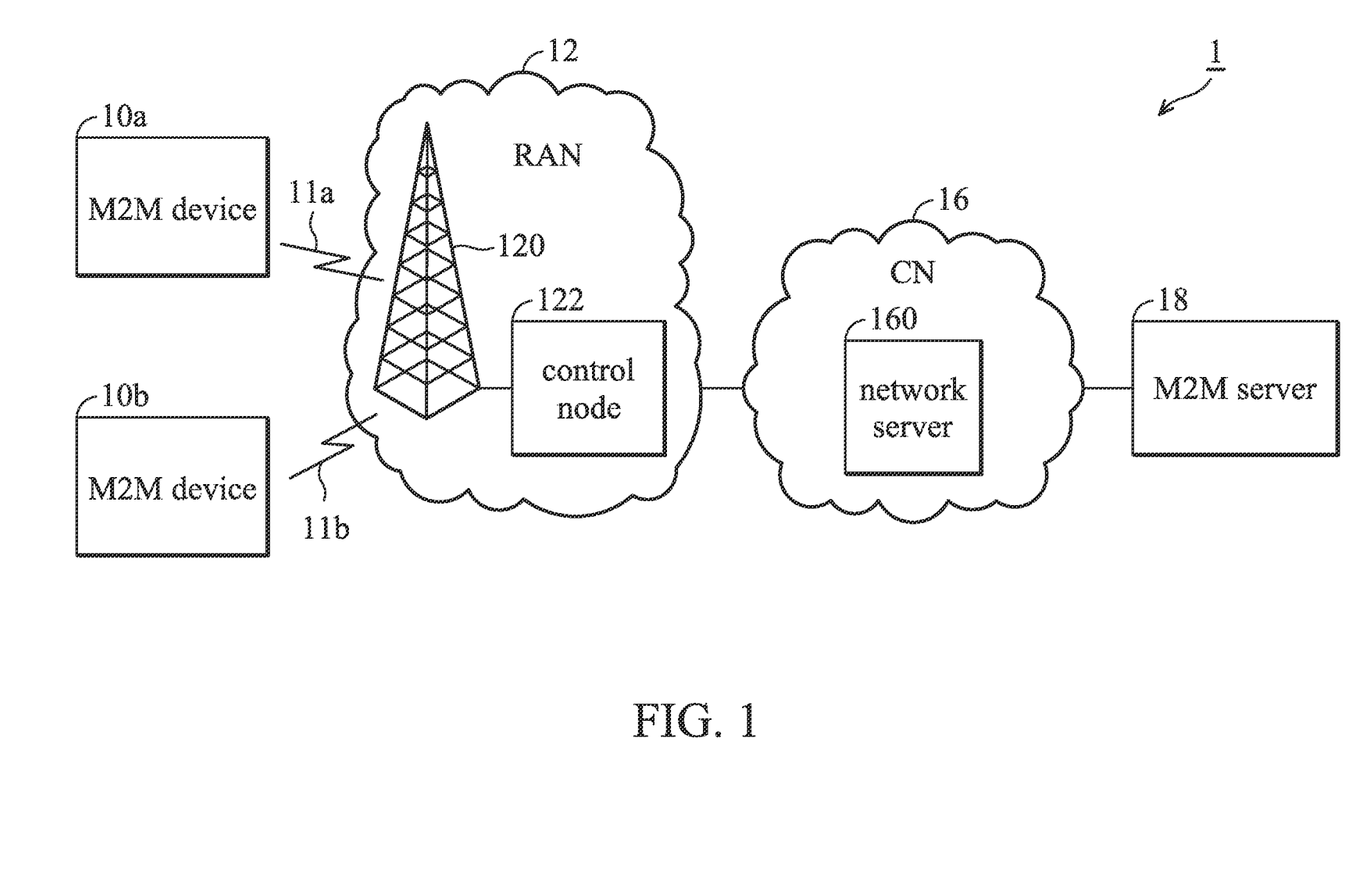
FIG. 1 is a system diagram of a communication system 1 which supports M2M communications according to an embodiment of the invention.

FIG. 1 is a system diagram of a communication system 1 which supports Machine-to-Machine (M2M) communications according to an embodiment of the invention. The communication system 1 contains M2M devices 10a and 10b, a radio access network (RAN) 12, a core network (CN) 16 and a M2M server 18. The M2M devices 10a and 10b are wirelessly coupled to the RAN 12, which is coupled to the CN 16 via wired, wireless, or combinational connections, and subsequently to the M2M server 18. The RAN 12 contains a base station 120 and a control node 122 coupled thereto. The M2M devices 10a and 10b communicate with the base station 120 via communication channels 11a and 11b therebetween. The M2M data from the M2M devices 10a and 10b can be sent to the RAN 12, and further through the CN 16 passed to the M2M server 18 for subsequent data analysis and processing. For example, when the M2M device 10a transmits an alert for a M2M event to the M2M server 18, the M2M server 18 can issue a text message to a M2M user, informing of the occurrence of the M2M event on the M2M device 10a and any issue that needs to be taken care of.

The M2M devices 10a and 10b may be handheld cellular phones, notebook computers equipped with network adaptors, or any other devices capable of performing wireless communications. The M2M devices 10a and 10b may be mobile or fixed M2M devices. Each M2M device can be identified by a unique device ID, such as a Mobile Identifier Number (MIN), an International Mobile Subscriber Identifier (IMSI), a Universal Integrated Circuit Card (UICC), and so on. Although FIG. 1 only shows two M2M devices 10a and 10b, it would be apparent to those skilled in the art that more than two M2M devices may be incorporated into an M2M group.

The base station 120 provides communication services to all mobile devices and M2M devices within cell coverage, including M2M services. Although only one base station 120 is illustrated in the communication system 1, it would be apparent to those skilled in the art that the cell coverage can be provided by more than one base station, and the base station 120 can also provide services to more than one cell coverage area. The communication services include the second, third, fourth generation communication services, such as Global System for Mobile (GSM) communication, Universal Mobile Telecommunication System (UMTS), Long Term Evolution (LTE), etc.

When detecting an M2M event, the M2M device can send the M2M data to the base station 120. The M2M event may be, for example, transmitting a meter reading, or an alert of an abnormal condition. The abnormal condition may include a change in the point of attachment, transmitting data for an unscheduled duration, a change in a device ID of the M2M device, loss of network connectivity, and so on. The M2M device can be woken up from a sleep mode or an idle mode at a fixed or a variable interval to perform detection or measurement of an M2M event. Upon detecting or measuring an M2M event, the M2M device can transfer information of the M2M event by the M2M data to the service network which includes the RAN 12 and the CN 16, and return to the sleep mode or the idle mode that the M2M device was in before performing the detection or measurement of the M2M event, thereby reducing power consumption. Because the communication standard associated with M2M specifies that an M2M device is required to transfer power-down registration information to the service network every time before being powered down, the M2M device has to transmit the power-down registration information before being powered down even if only short M2M data are transmitted. Refer to the embodiment in FIG. 2, which illustrates a message sequence chart of power-down registration method 2 in M2M communications of the related art.

Figure 2:
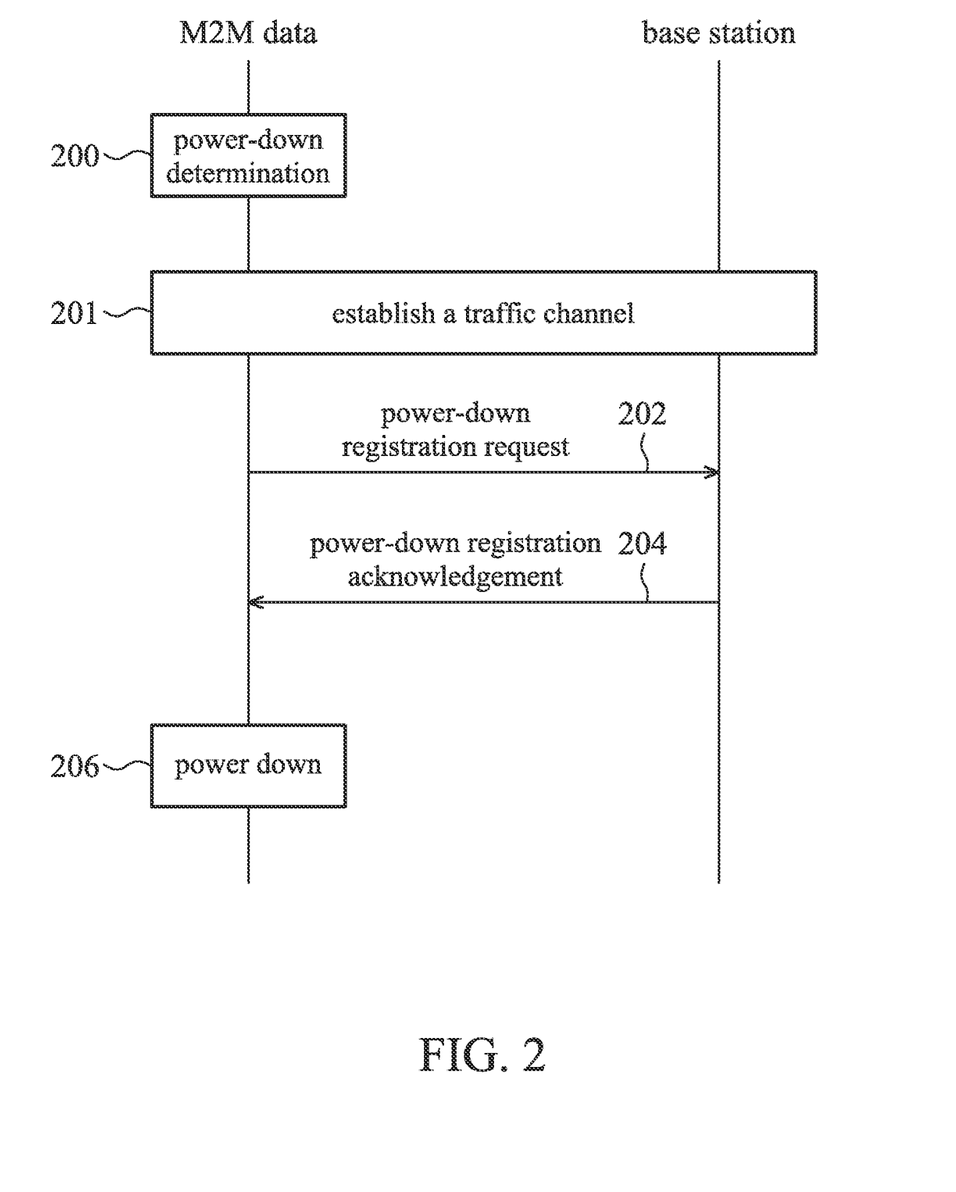
FIG. 2 illustrates a message sequence chart of power-down registration method 2 in M2M communications of the related art.

Firstly, a channel is established between the M2M device and the base station, so that the M2M device can upload the M2M data to the base station. The type of the established channel is determined by data size of the M2M data. When the data size of the uploaded M2M data is small, an access channel type is established, whereas when the data size of the uploaded M2M data is large, a traffic channel type is established. The M2M device transfers the M2M data through the established channel.

After completion of the M2M data transfer, the M2M device can determine to be powered down and perform a power-down event 200. If the M2M device has established an access channel with the base station, the M2M device can inform the base station of the imminent power-down event and report the current location of the M2M device by issuing a power-down registration request message 202 over the access channel. If the M2M device has established a traffic channel with the base station, the M2M device must establish another access channel 201 with the base station, then issue a power-down registration request message 202 to the base station via the access channel. In response to the power-down registration request message 202, the base station can return a power-down registration acknowledgement message 204 on the access channel, indicating that the power-down registration request message 202 has been received and acknowledged. Upon reception of the power-down registration acknowledgement message 204, the M2M device can be powered down and enter the sleep mode or shut down the power.

The power-down registration method 2 provides a power-down registration procedure by transmitting a dedicated power-down registration message on the access channel through the M2M device, establishing the access channel and transferring the independent power-down registration request message, which requires increased network resources and increased power consumption of the M2M device.

Figure 3:
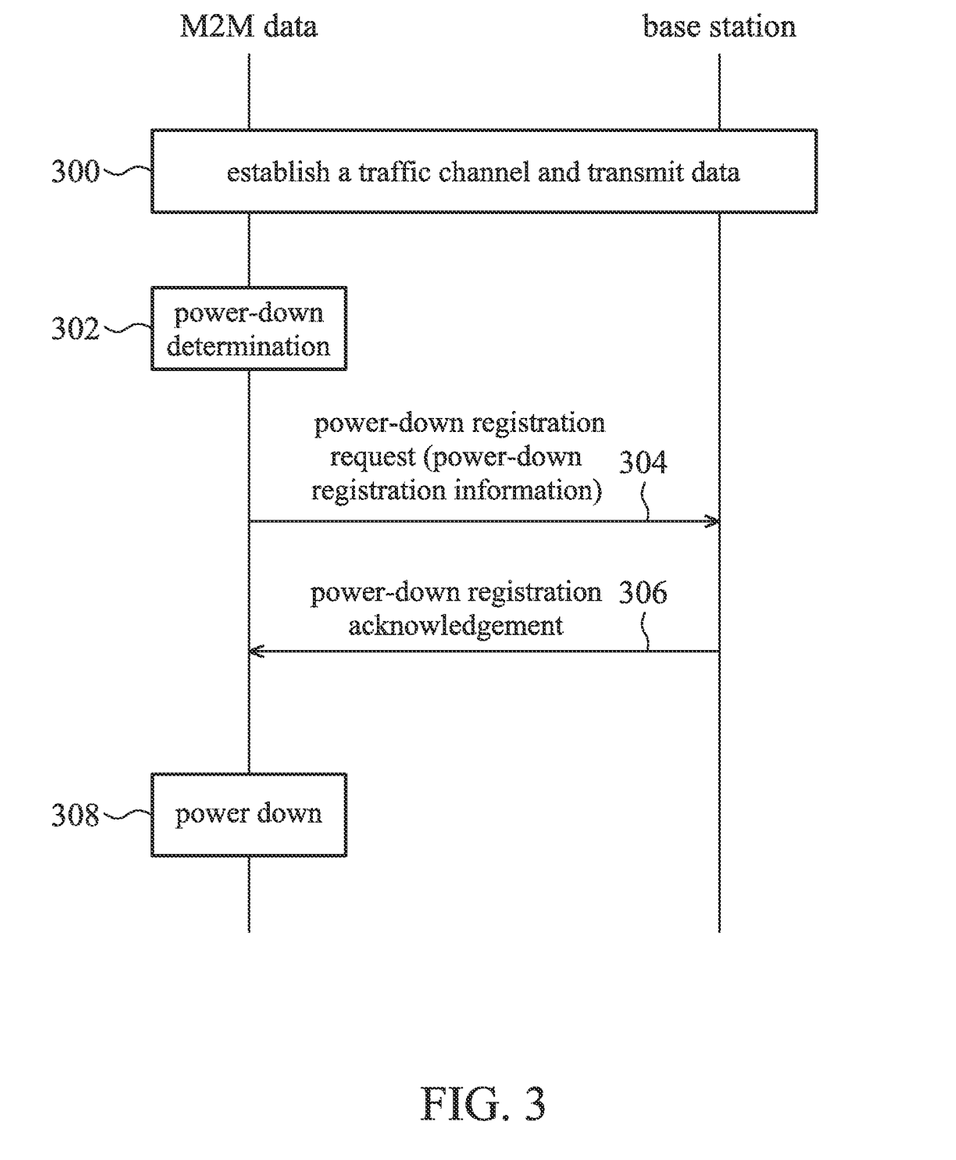
FIG. 3 is a message sequence chart of a power-down registration method 3 in M2M communications according to an embodiment of the invention.

FIG. 3 is a message sequence chart of a power-down registration method 3 in M2M communications according to an embodiment of the invention, incorporating the M2M devices 10a or 10b and the base station 120 in FIG. 1.

The power-down registration method 3 is applicable in conditions where a traffic channel is utilized for transferring the M2M data. Firstly, the M2M device can determine a need for transferring a large amount of M2M data, and thus establish a traffic channel 300 with the base station, and upload the M2M data to the base station via the traffic channel. After or just before the completion of the M2M data transfer, the M2M device can determine and execute a power-down event 302. The M2M device can send a channel release order message 304 to the base station via the established traffic channel, wherein the channel release order message 304 contains power-down information including current position and notification of the imminent power-down of the M2M device. In response to the channel release order message 304, the base station can respond with a channel release acknowledgement message 306 on the traffic channel, indicating that the power-down registration information has been received and the release of the channel has been acknowledged. Upon receiving the channel release acknowledgement message 306, the M2M device can release the radio resource associated with the channel and proceed with the power-down procedure 308, entering the sleep mode or turning off the power. The power-down registration method 3 only utilizes the traffic channel to transfer the M2M data and the power-down registration information without the need for establishing another access channel, fully employing the limited network resources and reducing the power consumption of the M2M device.

The power-down registration method 3 allows the M2M device to transmit the power-down registration information along with the channel release request message over the traffic channel to the base station, without the need for establishing another access channel, fully employing the limited network resources and reducing the power consumption of the M2M device.

Figure 4:
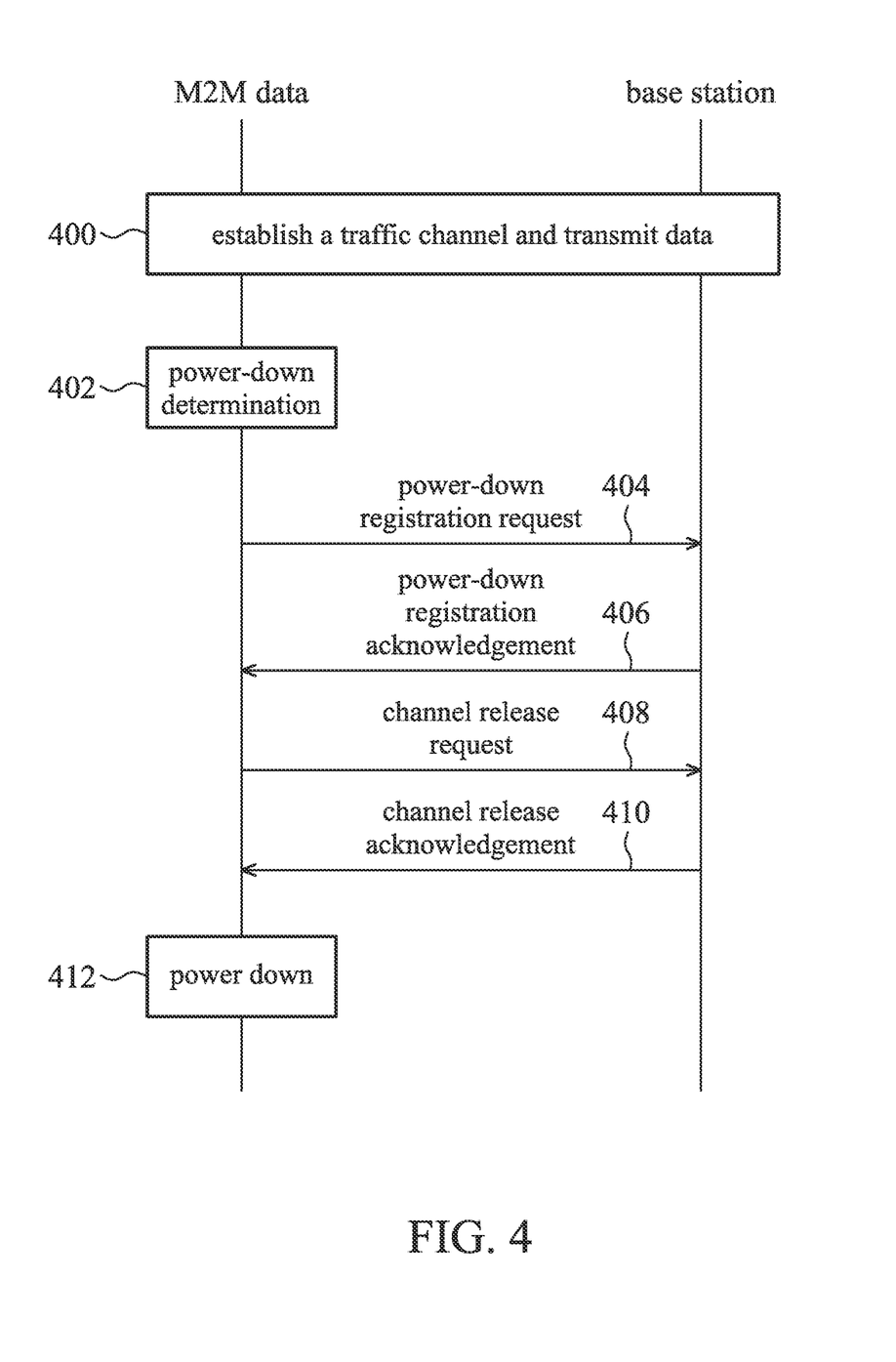
FIG. 4 is a message sequence chart of a power-down registration method 4 in M2M communications according to an embodiment of the invention.

FIG. 4 is a message sequence chart of a power-down registration method 4 in M2M communications according to an embodiment of the invention, incorporating the M2M devices 10a or 10b and the base station 120 in FIG. 1.

The power-down registration method 4 is applicable in a condition where a traffic channel is utilized for transferring the M2M data. Firstly, the M2M device can determine a need of transferring a large amount of M2M data, therefore establish a traffic channel 400 with the base station, and upload the M2M data to the base station via the traffic channel. After or just before the completion of the M2M data transfer, the M2M device can determine and execute a power-down event 402. The M2M device can send an independent power-down registration request message 404 to the base station via the established traffic channel, wherein the power-down registration request message 404 contains current position and notification of the imminent power-down of the M2M device. In response to the power-down registration request message 404, the base station can respond with a power-down registration acknowledgement message 406 on the traffic channel, indicating that the power-down registration request message has been received. Upon receiving the power-down registration acknowledgement message 406, subsequently the M2M device can send a channel release request message 408, informing the base station of the completion of the M2M data transfer and that the radio resources of the traffic channel can be released. In response to the channel release request message 408, the base station can return a channel release acknowledgement message 410. After receiving the channel release acknowledgement message 410, the M2M device can release the radio resource associated with the channel and proceed with the power-down procedure 412, entering the sleep mode or turning off the power. The power-down registration method 4 only utilizes the traffic channel to transfer the M2M data and the power-down registration information without the need for establishing another access channel, fully employing the limited network resources and reducing the power consumption of the M2M device.

The power-down registration method 4 allows the M2M device to transmit the independent power-down registration message over the traffic channel to the base station, without the need for establishing another access channel, fully utilizing the limited network resources and reducing the power consumption of the M2M device.

Figure 5:
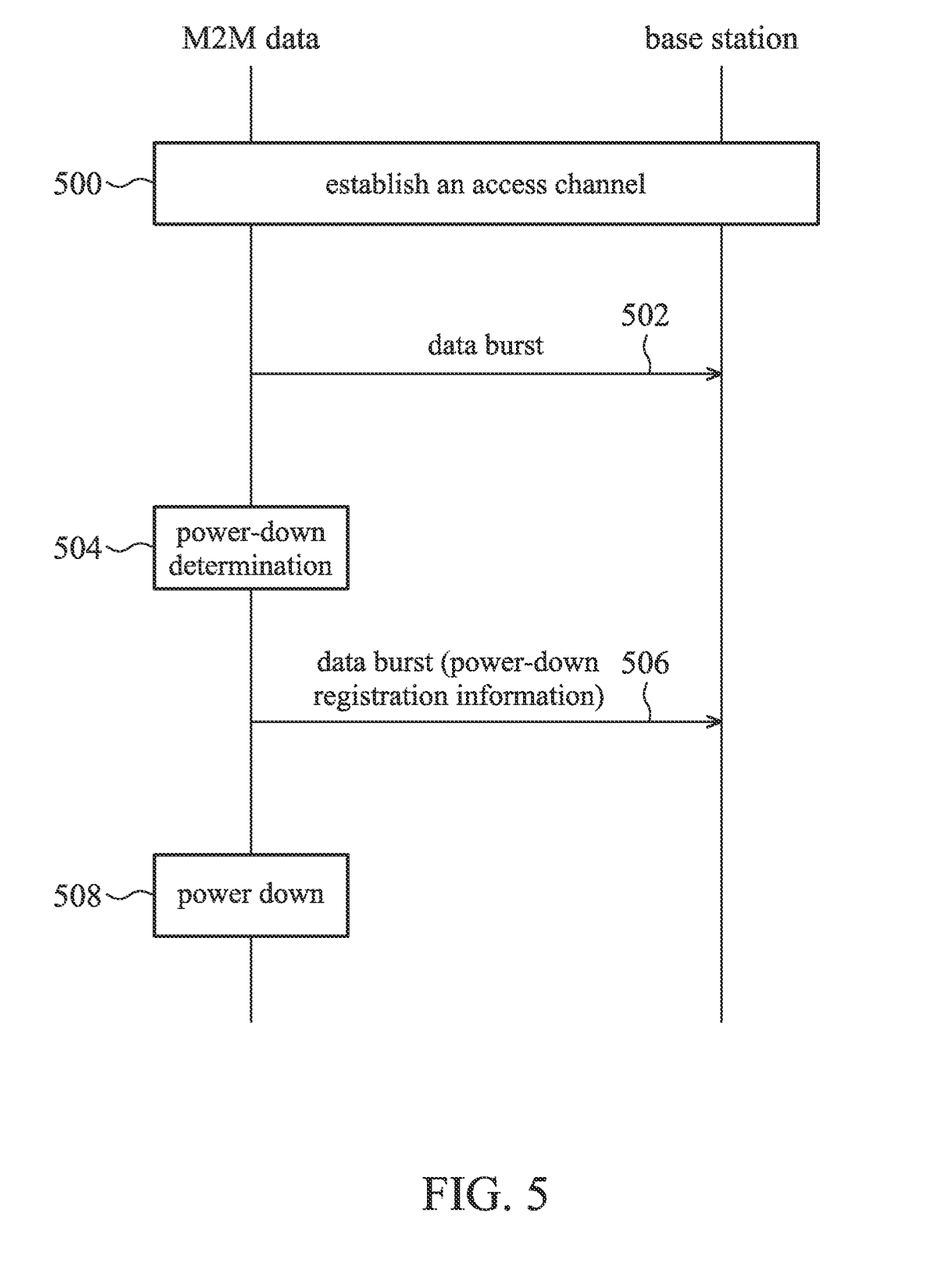
FIG. 5 is a message sequence chart of a power-down registration method 5 in M2M communications according to an embodiment of the invention.

FIG. 5 is a message sequence chart of a power-down registration method 5 in M2M communications according to an embodiment of the invention, incorporating the M2M devices 10a or 10b and the base station 120 in FIG. 1.

The power-down registration method 5 is applicable in conditions where an access channel is utilized for transferring the M2M data. Firstly, the M2M device can determine the need to transfer a small amount of M2M data, and therefore establish an access channel 500 with the base station, and upload the M2M data 502 by means of the data burst to the base station via the access channel. Just before the completion of the M2M data transfer, the M2M device can determine and execute a power-down event 504. The M2M device can include the power-down registration information into the data burst 506 and send the data burst 506 to the base station through the access channel, wherein the power-down registration request information contains the current position and the notification of the imminent power-down of the M2M device. After completion of transmitting the data burst 506, the M2M device can release the radio resources associated with the channel and proceed with the power-down procedure 508, entering the sleep mode or turning off the power. The M2M device utilizes the access channel to transfer the M2M data and then sends the power-down registration information via the already-established access channel, and delivers the power-down registration information along with the data burst to the base station, fully utilizing the limited network resources and reducing the power consumption of the M2M device.

The power-down registration method 5 allows the M2M device to transmit the power-down registration information along with the last data burst over the access channel to the base station, fully utilizing the limited network resources and reducing the power consumption of the M2M device.

The power-down registration method 5 can be adopted with the power-down registration method 3 or 4, i.e., when the M2M data are delivered via the traffic channel then so are the power-down registration information, and when the M2M data are delivered via the access channel then so are the power-down registration information. In this way, it is not needed to establish another traffic channel for transmitting the power-down registration information, effectively utilizing the limited network resources and reducing the power consumption of the M2M device.

Figure 6:
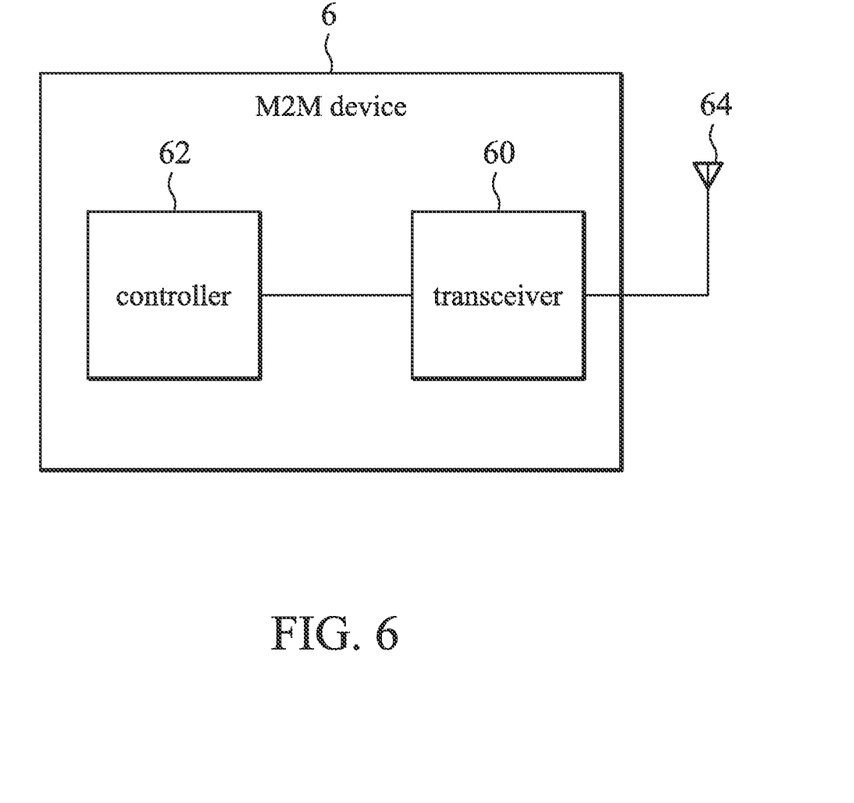
FIG. 6 is a block diagram of an M2M device 6 according to an embodiment of the invention.

FIG. 6 is a block diagram of a M2M device 6 according to an embodiment of the invention, including a transceiver 60, a controller 62 and an antenna 64. The controller 62 is coupled to the transceiver 60, which in turn is coupled to the antenna 64.

In one embodiment, the M2M device 6 adopts the traffic channel for delivering the power-down registration. When the controller 62 determines the necessity of transmitting the M2M data to an M2M service provider, the transceiver 60 can establish the traffic channel with the base station via the antenna 64, and transfer the M2M data via the traffic channel. After or just before the completion of the data transfer of the M2M data, the controller 62 can determine that the M2M device 6 is required to be powered down after the completion of the data transfer, and pass the power-down registration information to the transceiver 60, which in turn delivers the power-down registration information to the base station via the traffic channel by the antenna 64. The power-down registration information contains current position and notification of the imminent power-down of the M2M device. The M2M device 6 can include the power-down registration information into the channel release request message, or employ an independent message to carry the power-down registration information to the base station.

In another embodiment, the M2M device 6 adopts the access channel for delivering the power-down registration. When the controller 62 determines the necessity of transmitting the M2M data to the M2M service provider, the transceiver 60 can establish the access channel with the base station via the antenna 64, and transfer the M2M data via the access channel. After or just before the completion of the data transfer of the M2M data, the controller 62 can determine that the M2M device 6 is required to be powered down after the completion of the data transfer, include the power-down registration information into the last data burst and transfer the last data burst together with the power-down registration information to the transceiver 60, which in turn delivers the last data burst together with the power-down registration information to the base station via the access channel by the antenna 64. The power-down registration information contains current position and notification of the imminent power-down of the M2M device. Upon delivering the last data burst, the M2M device 6 can be powered down straightaway, without the need for transmitting an independent power-down registration request message and waiting for the response of the power-down registration acknowledgement message.

The M2M device 6 can adopt the two embodiments separately or conjointly, allowing increased flexibility in performing the power-down registration procedure with the traffic channel and/or the access channel. When the M2M data are delivered via the traffic channel then so are the power-down registration information, and when the M2M data are delivered via the access channel then so are the power-down registration information. In this way, it is not needed to establish another traffic channel for transmitting the power-down registration information, effectively utilizing the limited network resources and reducing the power consumption of the M2M device.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, units, modules, circuits and systems described herein may be implemented by ways of, but not limited to, hardware, firmware, software, software in execution, and a combination thereof.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication method, adopted by a machine-to-machine device, comprising:
    establishing a traffic channel with a base station;
    transmitting machine-to-machine data through the traffic channel, wherein during a process and prior to a completion of transmitting the machine-to-machine data, the communication method further comprises:
        determining that the machine-to-machine device is going to be powered down; and
        transmitting power-down registration information through the traffic channel, wherein the power-down registration information includes a current position and notification of imminent power down; and
    wherein in response to the completion of transmitting the power-down registration information, releasing radio resources associated with the traffic channel and turning off power by the machine-to-machine device.

2. A machine-to-machine device, comprising:
    a transceiver, configured to establish a traffic channel with a base station, and transmit machine-to-machine data through the traffic channel; and
    a controller, configured to determine, during a process and prior to a completion of the machine-to-machine data transmission, that the machine-to-machine device is going to be powered down; wherein the transceiver is configured to transmit power-down registration information through the traffic channel, wherein in response to the completion of machine-to-machine data transmission, the controller is further configured to facilitate powering off of the machine-to-machine device.

* * * * *